United States Patent [19]

Blyler, Jr. et al.

[11] Patent Number: 4,761,168

[45] Date of Patent: Aug. 2, 1988

[54] OPTICAL FIBER MANUFACTURING TECHNIQUE

[75] Inventors: Lee L. Blyler, Jr., Basking Ridge; Arthur C. Hart, Jr., Chester; Richard C. Progelhof, Berkeley Heights, all of N.J.

[73] Assignee: American Telephone and Telegraph Company, AT&T Bell Laboratories, Murray Hill, N.J.

[21] Appl. No.: 910,562

[22] Filed: Sep. 22, 1986

[51] Int. Cl.[4] ..................... C03B 37/02; C03B 37/023
[52] U.S. Cl. ........................... 65/3.1; 65/3.11; 65/12
[58] Field of Search .............. 65/3.43, 3.44, 3.1, 65/3.11, 3.4, 13, 12; 427/165, 169

[56] References Cited

U.S. PATENT DOCUMENTS

| | | | |
|---|---|---|---|
| 4,126,015 | 11/1978 | Fujie | 62/284 |
| 4,412,509 | 11/1983 | Black | 165/160 X |
| 4,437,870 | 3/1984 | Miller | 65/12 |
| 4,514,205 | 4/1985 | Darcangelo | 65/12 |
| 4,613,521 | 9/1986 | Smith | 427/169 |

OTHER PUBLICATIONS

"Cooling and Bubble-Free Coating of Optical Fibers at a High Drawing Rate", *Journal of Lightwave Technology*, LT-4, C. M. G. Jochem and J. W. C. Van Der Ligt, 1986, pp. 739-742.

Primary Examiner—Kenneth M. Schor
Attorney, Agent, or Firm—Bruce S. Schneider

[57] ABSTRACT

The speed at which optical fibers can be drawn and coated is significantly increased by efficiently stripping the gas boundary layer entrained by the moving fiber. The stripping is periodically repeated to ensure that the entrained flow is not re-established.

7 Claims, 2 Drawing Sheets

OPTICAL FIBER MANUFACTURING TECHNIQUE

CROSS REFERENCE TO RELATED APPLICATIONS

This application is related to U.S. application Ser. No. 761,403, filed Aug. 1, 1985, which is a divisional application of U.S. application Ser. No. 519,494, filed Aug. 1, 1983, both of which are hereby incorporated by reference.

BACKGROUND OF THE INVENTION

1. Field of the Invention

This invention relates to optical fibers and, in particular, to coated optical fibers.

2. Art Background

Optical fibers are generally drawn from a glass body (typically denominated a preform) and coated with a protective organic coating in one continuous process. This continuous process is accomplished with an apparatus (a drawing tower). The fiber is initially drawn from the preform and then coated by passing it through a reservoir of organic material. Organic liquids which are UV-curable (e.g., acrylated resins such as epoxy acrylates and urethane acrylates) or thermally curable, e.g., silicones, are often employed so that the complete formation of the final coating is conveniently accomplished merely by irradiation or heating.

The coating procedure -- not the drawing procedure -- usually limits the maximum rate at which an acceptable, coated fiber is produced. Since a large capital investment is involved in a drawing tower, it is naturally desirable to run the drawing and coating process at the highest speed that is consistent with the production of a coating of acceptable quality. In the manufacture of 125 μm in diameter fiber utilizing typical coating procedures, e.g., where a UV-curable urethane-acrylate coating and where a distance of 1.25 m between drawing and coating points is employed, drawing speeds of approximately 1.3 m/sec are employed. At faster speeds coating irregularities such as beads, thickness nonuniformities and in severe cases intermittent coatings typically occur. Generally, to ensure desirable transmission performance in a fiber cable—a body containing a multiplicity of fibers—the coating outside diameter should not vary more than ±10 percent. A significant parameter affecting the development of coating irregularities is the temperature of the fiber entering the coating liquid. It is believed that if the fiber is not sufficiently cool the coating material does not form a continuous film of acceptable uniformity. Thus the faster the coating rate the shorter the time for cooling and the lower the likelihood of forming a suitable coating.

Various techniques have been investigated to allow more rapid drawing and coating speeds while maintaining coating quality. The most established technique, which allows a desirable increase in speed, involves increasing the distance between the point the fiber is drawn and the point of entry of the fiber into the coating liquid yielding more time for cooling. However, this increased distance requires a significantly larger drawing apparatus and a concomitant increase in capital investment.

Other techniques directed to increasing coating speed have been investigated. For example, an air flow has been directed onto the fiber after it is drawn, but before it is coated. Two significant adverse consequences have resulted from this procedure. An air flow sufficient to allow significant speed increase also causes substantial fiber vibration. This vibration, in turn, produces unacceptable variations in fiber diameter. (An acceptable variation is a standard deviation over the length of the fiber of less than 1%, preferably less than 0.25%.) Additionally, it has been reported that the use of air degrades the mechanical properties of the fiber. (See Paek and Schroeder, *Applied Optics*, Vol. 20, 1981.) The use of helium as a coolant rather than air has also been suggested. (See European Patent application No. 82305708.8, filed Jan. 11, 1982, having a publication number 8079186.) Helium injected in a radial direction relative to the fiber was reported to increase fiber coating speed.

Although quite useful drawing speeds have been attained, significantly higher speeds produce corresponding economies.

SUMMARY OF THE INVENTION

It has been found that the efficiency of fiber cooling and, thus, the rate of fiber coating, strongly depends upon the heated gas boundary layer entrained around the fiber. This heated gas boundary layer, unless repeatedly stripped, i.e., stripped three or more times from the fiber, substantially diminishes cooling efficiency which, in turn, limits the coating speed. Thus, the inventive technique involves multiple stripping of the gas boundary layer to increase fiber fabrication rates. In the inventive technique, the gas boundary layer is stripped at least three times. Additionally, appropriate coordination of this stripping substantially increases attainable coating rates. In particular, a first stripping means is employed so that the thickness of the gas boundary layer is reduced to at most one tenth of the comparative thickness in the absence of the stripping. Further, at least a second and third stripping means are positioned to satisfy three criteria. Firstly, the stripping induced by the second and third means should be accomplished before the parameter $(1/Re_a) \cdot (x/a)$ exceeds 1000 where x is the distance between the stripping of one means and the inception of boundary layer reduction by the subsequent means, a is the fiber radius and $Re_a$ is the Reynold's number that is defined by $V(a/\nu)$ where V is fiber velocity and $\nu$ is the kinematic viscosity of the gas. Secondly, the minimum spacing between the stripping means should be greater than $10\Delta$ where $\Delta$ is the average distance from the fiber surface to the stripping means or 3.2 mm, whichever is smaller. Thirdly, the second and third stripping means should reduce the thickness of the gas boundary layer by at least 90 percent.

In one embodiment, barrier plates positioned approximately 25 mm apart, having an opening for fiber passage of approximately 1.5 mm diameter are employed. A flow of cooling fluid, e.g., a gas such as air or helium, along the path traversed by the fiber within the stripping vessel in a counter-current direction is advantageously utilized with these plates to induce stripping. (Flow rates in the direction of fiber travel could also be employed.) To allow sufficient heat transfer from the stripped gas boundary layer, pins integrally attached to the body of the stripping vessel are provided between stripping plates to act as extended surfaces to induce heat transfer from the stripping fluid contained within the stripping vessel to the body of the stripping vessel. It is possible to gain additional enhancement of heat transfer by providing for the circulation of coolant within the walls of the stripping vessel. Through these expedients coating speed is increased with essentially no degradation of fiber properties.

DETAILED DESCRIPTION

As discussed, the invention involves the multiple stripping (three or more) of the entrained gas boundary layer from a fiber before coating. The boundary layer is stripped so that its thickness is reduced to less than 10% of the thickness associated with the gas boundary layer in the absence of the stripping means. (The gas boundary layer is defined by a region extending from the fiber surface to the radial position within the fluid at which the temperature of the fluid is the ambient temperature plus 1% of the difference between the fiber surface temperature and the ambient temperature.)

Figure 1:
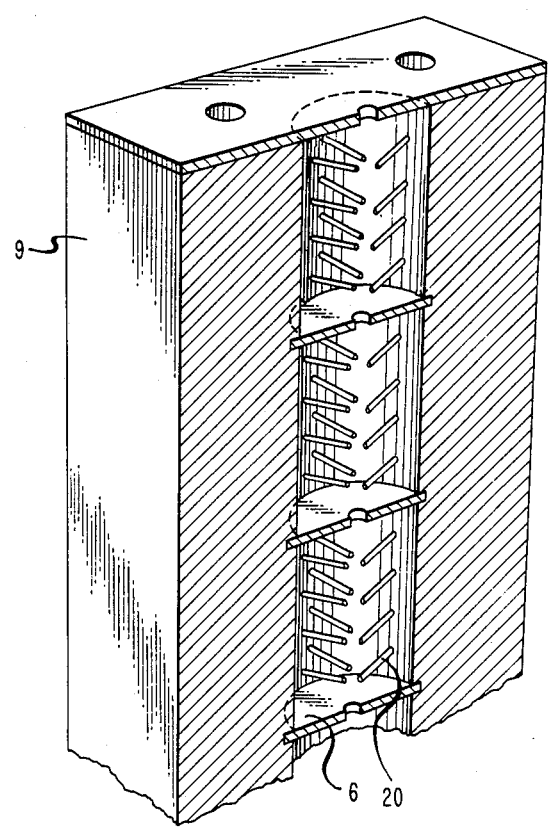
FIG. 1 is illustrative of stripping means suitable for use in the invention.

A variety of expedients are available for accomplishing such stripping. For example, in one embodiment, a physical barrier is employed in conjunction with a gas flow. This barrier should preferably be in close proximity to the fiber surface. However, since some radial movement of the fiber during processing is expected, typically without a feedback mechanism for centering the fiber, the physical barrier should not be closer than 0.25 mm to the fiber. A specific embodiment is shown in FIG. 1 where member, 6, is a circular metallic plate held in vessel, 9, and having a circular hole of approximately 1.5 mm in diameter through which the fiber passes. (FIG. 1 for clarity is a cross-section of the apparatus.)

The purpose of the barrier is to ensure that the velocity of a gas flow through the barrier in combination with any stripping done by the barrier itself is sufficient to yield the desired stripping. (A barrier need not be present if a gas flow with sufficient velocity is established by another means without inducing undesirable vibration of the fiber.) The direction of the stripping gas flow is established either counter to or cocurrent with the direction of fiber travel. (This flow is preferably confined to be symmetrical around the fiber so that excess vibration is not induced.) Generally, to achieve the desired level of boundary layer reduction by the first stripping means, a fluid flow, e.g., a gas flow having a radial velocity gradient at the fiber surface greater typically than 500,000 sec$^{-1}$, yields a gas boundary layer reduction of greater than 90%. (See R. B. Bird et al, *Transport Phenomena*, John Wiley & Sons, New York, 1960, pages 3–5, for a definition of radial velocity gradient.) For example, gas flows in the range 10 to 40 l/m in conjunction with barrier openings in the range 1 to 3 mm typically yield boundary layer reductions of 90% or greater. The particular fluid utilized to establish this stripping is not critical. Fluids such as air, helium or nitrogen are suitable. (Helium, however, yields higher attainable coating speeds than other gases.) It is also advantageous that the stripping fluid be at a relatively low temperature compared to the entrained boundary layer, i.e., the temperature difference between the fiber and the stripping fluid should be at least as great as the temperature difference between the stripping fluid and the ambient air temperature.

To achieve the excellent coating rates of the invention, at least a second and third stripping are required. The same expedients as described for the first stripping are suitable. However, the second and third stripping need not be done in an identical manner to the first or to each other. Although the particular expedient utilized for the second and third stripping procedure is not critical, the interval between stripping is quite significant. In particular, the stripping should be adjusted to satisfy three criteria. (In the context of the invention, stripping by a particular stripping means is considered to occur at the last position along the axis of fiber travel where the boundary layer thickness is reduced by the particular means to its minimum value.) The second and third stripping procedure should be accomplished before the parameter $(1/Re_a)\cdot(x/a)$ after the previous stripping exceeds the value of 1000 where x is the distance between stripping of one means to the inception of boundary layer reduction by the subsequent means, a is the fiber radius, and $Re_a$ is the Reynold's number that is defined by $V(a/\nu)$ where V is fiber velocity and $\nu$ is the kinematic viscosity of the gas. (See D. Bourne and D. Elliston, *International Journal of Heat and Mass Transfer*, 13, 583 (1970).) The second and third stripping should occur at a distance from the previous stripping greater than $10\Delta$ where $\Delta$ is the average radial distance from the fiber surface to the stripping means of 3.2 mm whichever is smaller. (The stripping gas means is located for the purpose of measuring $\Delta$, at the point of the nearest physical structure functioning as a director of the stripping gas flow.) The second and third stripping means (and preferably although not necessarily all subsequent stripping means) should each reduce the gas boundary layer by at least 90 percent from the level that would have been attained at the proposed stripping point in the absence of the stripping means being considered. That is the 90% reduction is measured for the second stripping means as compared to the boundary layer obtained in the presence of all stripping means but the second. Similarly, the 90% reduction is measured for the third stripping means as compared to the boundary layer obtained in the presence of all stripping means but the third. (In this context the second and third stripping means need not be adjacent means. Intervening stripping means are not precluded provided the second and third means satisfy the stated conditions.)

To satisfy the criteria associated with the stripping interval, a variety of specific embodiments is possible. For example, the use of three physical barriers having openings for the fiber in the range 1 to 3 mm are positioned in a parallel configuration with the distance between barriers in the range 1 to 5 cm. Additionally, a stripping fluid flow is employed where a flow rate in the range 10 to 40 l/m is utilized. Although the precise positioning of the three barriers and the precise flow rate are dependent upon the particular shape of the vessel containing these means, upon the fiber drawing rate, and upon the method utilized to remove heat from the environment of the stripping means, control samples are easily utilized to establish the desired criteria. (The degree of gas boundary layer reduction is measured with a hot wire anemometer as described by F. Kreith and M. Bohn, *Principles of Heat Transfer*, pp. 357 and 358, Harper & Row (1986).)

Although three stripping processes with an appropriate stripping interval are sufficient to produce significant increases in attainable coating speed without degradation of fiber properties, the use of additional stripping processes further augments this effect. For example, the use of twelve stripping processes allows speeds in the range 5 to 12 m/sec as compared to 4 m/sec when no stripping processes are employed. Generally, space considerations are the primary limitations on the number of stripping means utilized. Typically, it is desirable that no more than one-half the distance from the furnace to the first fiber supporting device, e.g. capstan or sheave, in the direction of fiber travel be occupied by the stripping apparatus because of the spatial requirements for coating, curing, and measuring equipment. Thus, generally, the number of stripping processes is limited to less than 50. However, if space limitations are not present, the number of stripping processes is advantageously increased.

Once the gas boundary layer is suitably stripped, the heat associated with the stripped gas should be removed. If the heat is not removed, the temperature difference between the stripping fluid and the fiber is diminished and heat transfer is thus reduced. Generally, the heat associated with the stripped gas boundary layer should be removed so that at every point along the axis of fiber travel the temperature difference between the fiber and stripping fluid is at least as great as the temperature difference between the stripping fluid and the ambient air. A variety of methods is available to accomplish this objective. For example, heat sinks are provided. Exemplary of such expedient is the configuration shown in FIG. 1, where pins 20 embedded in the body of the stripping vessel act as extended surfaces, remove heat from the stripping gas, and conduct it to the body of the stripping vessel.

The following examples are illustrative of the invention.

EXAMPLE 1

A coating procedure was performed on a tower utilizing a draw furnace held at 2200° C., a capstan that was regulated by a laser forward scattering monitor and control system to maintain fiber diameter uniformity, a coating applicator whose design is fully described in U.S. Pat. No. 4,480,898, issued Nov. 6, 1984 (which is hereby incorporated by reference), and for curing the coated fiber two 300 W/in lamps (D bulb) sold by Fusion Systems, Inc. The lamps were positioned so that the fiber was at the focal point of the lamp reflector system. The coating apparatus was fed with a urethane acrylate coating composition and was positioned approximately 3.31 m from the base of the draw furnace. A stripping apparatus, a portion of which is schematically shown in FIG. 1, was positioned so that its top entry orifice was approximately 2.75 m from the bottom of the draw furnace. The stripping apparatus included two rectangular halves that were hinged and provided with means for locking the halves together. The stripping apparatus was made from aluminum and was approximately 45.7 cm in length. When closed, the stripping apparatus had a 1.27 cm bore. In the closed configuration, circular stripper plates having a hole 1.59 mm in diameter in their center were positioned approximately 3.8 cm apart. Exit and entry ports were provided in the stripping vessel with diameters the same as the bore utilized for the stripping plates. The region between each set of stripper plates contained ten pins emanating radially from the bore wall that were uniformly spaced along a spiral path between the plates. The aluminum pins were 1.6 mm in diameter. The pins were press fit into appropriately positioned holes bored in the stripping vessel body and extended approximately 4.76 mm into the body. A central plenum region having dimensions of approximately 3.75 by 2.5 by 2.5 cm was provided between the upper and lower set of five compartments and was connected by a conduit to a gas supply means. A serpentine water cooling path reversing direction three times along the length of the body was milled to a depth of approximately 6.35 mm in each half of the stripping vessel utilizing a 6.35 mm diameter ball end mill. This path was sealed by covering it with an aluminum plate approximately 9.5 mm in thickness.

The vessel was positioned along the fiber route so that the fiber entered and emerged essentially through the center of the orifices provided. The two halves were sealed together utilizing silicone vacuum grease. The two halves were held together by a clamping pressure device. The stripping gas was introduced through the conduit provided so that it entered at two positions in the vessel plenum that were approximately 180 degrees apart. This flow was measured and controlled utilizing a Brooks Model 1370-01C2AAA rotometer with a size R-6-15-B tube and a flow control valve. The flow before entering the stripping vessel was filtered through a 0.6 $\mu$m Millipore Teflon ® filter. The rotometer was calibrated for each composition of stripping gas utilized. Chilled water at a temperature of approximately 4° C. was introduced into the water cooling passage of each half of the cooling vessel. A continuous flow of this cooling water was maintained throughout the coating procedure.

The fiber drawing was initiated utilizing a fused silica preform having a uniform refractive index. The draw furnace temperature and other conditions were established to yield a fiber diameter of 125 $\mu$m. (A uniform refractive index preform was utilized for convenience and had no effect on the experimental results.) Initial coating was done without an air flow through the stripping vessel. The speed of the fiber was gradually increased until an unstable coating was observed. The collapse of the meniscus at the point of entry of the fiber into the coating liquid was utilized as an indicator of this instability. The speed at which this instability began was approximately 2.6 m per second. Air was then introduced into the stripping vessel at a rate of just exceeding 1 l/m. Again, speed was increased until instability was observed. This procedure of increasing air flow and observing the rate at which instability initiated was repetitively performed and yielded the results shown graphically in FIG. 2. It should be noted that a speed of 9.75 m/sec was achieved at a flow rate of 37.5 l/m.

EXAMPLE 2

Figure 2:
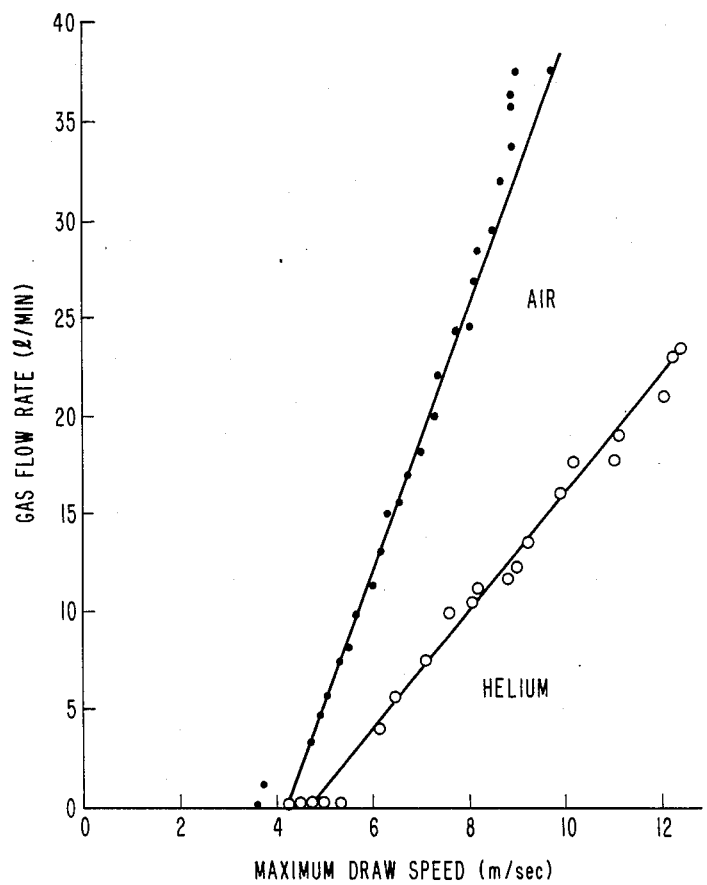
FIG. 2 is illustrative of results obtainable with the subject invention.

The same procedure was followed except helium rather than air was utilized as the stripping gas. The results are shown in FIG. 2. A speed of 12.4 m per second was achieved at a flow rate of 23.5 l/m. (The onset of instability with no flow of stripping gas was higher in the helium case because the atmosphere in the stripping vessel at the onset of the experiment contained predominantly helium gas which provided a modicum of cooling above that expected for an air environment.)

EXAMPLE 3

The procedure of Example 1 was followed utilizing a cooling water flow temperature of 5° C., a draw speed of 5.8 m per second, and an air flow ranging from 22 to 27 l/m. Five kilometers of coated fiber were collected under these conditions. The air flow was then discontinued, the draw speed was reduced to 4 m per second, and a second 5 km length of fiber was drawn, coated, and collected. The stripping vessel was then completely removed and a third 5 km length was drawn, coated, and collected at a speed of 3.9 m per second. All three 5 km lengths were then proof tested at 1.38 GPa using a conventional deadload type proof tester. No failures were observed for any of the lengths.

What is claimed is:

1. A process for fabricating a coated fiber comprising the steps of drawing an optical fiber from a heated glass body, cooling said drawn fiber, and coating said drawn, cooled fiber wherein a hot gas boundary layer surrounds the fiber after drawing and wherein said cooling is accomplished by a stripping apparatus comprising a plurality of stripping means for stripping hot gas away from said fiber, said plurality of means including at least a first, second and third stripping means disposed such that said fiber passes through an aperture in each means, wherein (1) said first stripping means reduces the gas boundary layer surrounding said fiber to a thickness of at most one-tenth the comparative thickness in the absence of stripping, (2) said second and third stripping means each induce stripping of the gas boundary layer to a thickness of no greater than 10 percent of the comparative thickness of the gas boundary layer in the absence of respectively said second and third stripping means, wherein the stripping of respectively said second means and of said third means begins before $(1/Re_a)\cdot(x/a)$ exceeds 1000 where x is the distance between the point of stripping of the preceding means and the inception of boundary layer reduction induced by respectively said second and third stripping means, a is the fiber radius and $Re_a$ is the Reynold's number and (3) the minimum spacing between said first and second stripping means and between said second and third stripping means is greater than $10\Delta$ where $\Delta$ is the average distance from the fiber surface to the stripping means or $\Delta$ is 3.2 mm, whichever is smaller.

2. The process of claim 1 wherein a means is supplied for removing heat from said stripping apparatus.

3. The process of claim 2 wherein said means for removing heat comprises a plurality of pins.

4. The process of claim 3 wherein said stripping means comprises a body with an orifice through which said fiber passes and a fluid flow.

5. The process of claim 1 wherein said stripping means comprises a body with an orifice through which said fiber passes and a fluid flow.

6. The process of claim 5 wherein said fluid comprises air.

7. The process of claim 5 wherein said fluid comprises helium.

* * * * *